US011059489B2

(12) United States Patent
Insana

(10) Patent No.: US 11,059,489 B2
(45) Date of Patent: Jul. 13, 2021

(54) METHODS AND SYSTEMS FOR DETECTING ROAD SURFACE CONDITIONS

(71) Applicant: Valeo Radar Systems, Inc., Hudson, NH (US)

(72) Inventor: David Insana, Manchester, NH (US)

(73) Assignee: Valeo Radar Systems, Inc., Troy, MI (US)

( * ) Notice: Subject to any disclaimer, the term of this patent is extended or adjusted under 35 U.S.C. 154(b) by 358 days.

(21) Appl. No.: 16/169,149

(22) Filed: Oct. 24, 2018

(65) Prior Publication Data

US 2020/0130697 A1    Apr. 30, 2020

(51) Int. Cl.
| | |
|---|---|
| *B60W 40/06* | (2012.01) |
| *G01S 13/89* | (2006.01) |
| *G01S 7/35* | (2006.01) |
| *G01B 15/08* | (2006.01) |

(52) U.S. Cl.
CPC ............ *B60W 40/06* (2013.01); *G01B 15/08* (2013.01); *G01S 7/352* (2013.01); *G01S 13/89* (2013.01); *B60W 2420/52* (2013.01); *G01S 2007/356* (2013.01)

(58) Field of Classification Search
CPC ............ B60W 2420/52; B60W 40/06; B60W 40/064; B60W 40/068; G01B 15/08; G01S 13/89; G01S 2007/356; G01S 7/352; G01S 13/42; G01S 13/584; G01S 13/60; G01S 13/931
See application file for complete search history.

(56) References Cited

U.S. PATENT DOCUMENTS

| | | | |
|---|---|---|---|
| 2006/0125679 A1* | 6/2006 | Horibe | G01S 13/867 342/52 |
| 2017/0315229 A1* | 11/2017 | Pavek | G01S 13/931 |
| 2018/0217231 A1* | 8/2018 | Stanley | G01S 7/411 |
| 2019/0072669 A1* | 3/2019 | Duque Biarge | G01S 13/4454 |
| 2020/0017083 A1* | 1/2020 | Casselgren | B60T 8/172 |

OTHER PUBLICATIONS

Häkli et al., "Road Surface Condition Detection using 24 GHz Automotive Radar Technology;" 14th International Radar Symposium (IRS), vol. 2; Jan. 2013; 6 Pages.

* cited by examiner

Primary Examiner — Timothy X Pham
(74) Attorney, Agent, or Firm — Daly, Crowley, Mofford & Durkee, LLP

(57) ABSTRACT

The present disclosure relates to detecting road surface conditions. A road surface detector comprises a transmitter, receiver, and one or more processors. The transmitter is configured to transmit one or more radio frequency (RF) beams at a road surface. The receiver is configured to receive RF reflections of the one or more transmitted RF beams at two or more receive channels. The one or more processors are to determine a road surface condition based on a doppler signature of the received RF reflections. A method comprises transmitting one or more radio frequency (RF) beams at a road surface. RF reflections of the one or more transmitted RF beams are receives at two or more receive channels. The method includes determining a road surface condition based on a doppler signature of the received RF reflections.

14 Claims, 13 Drawing Sheets

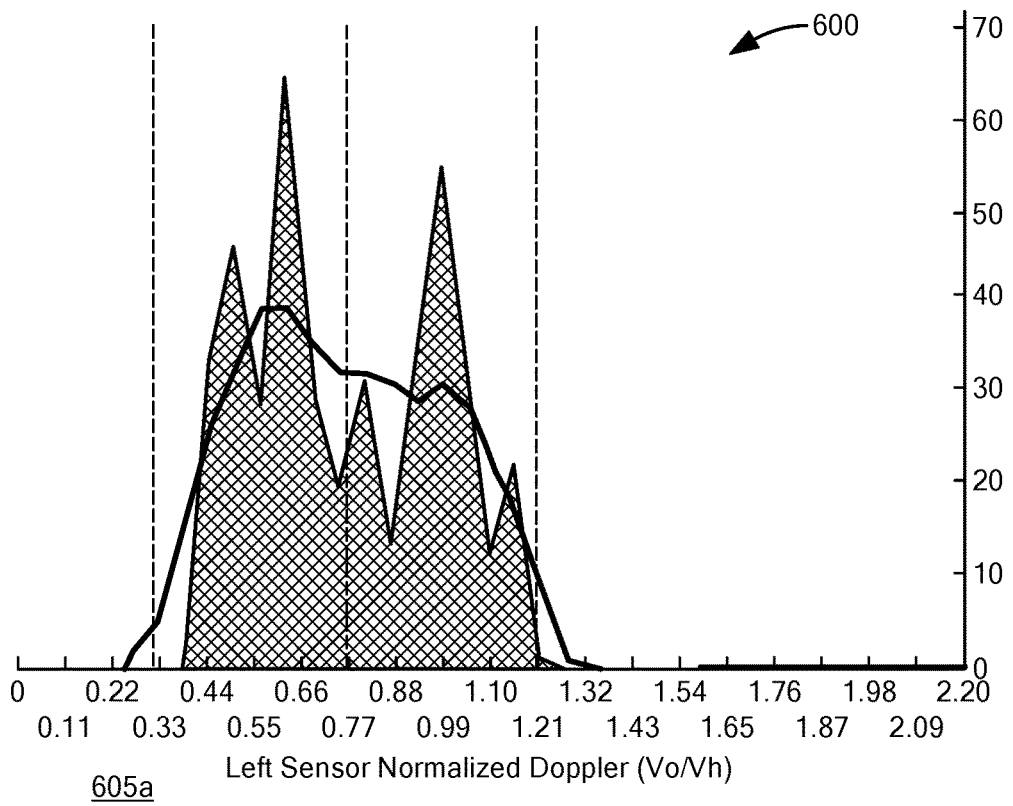
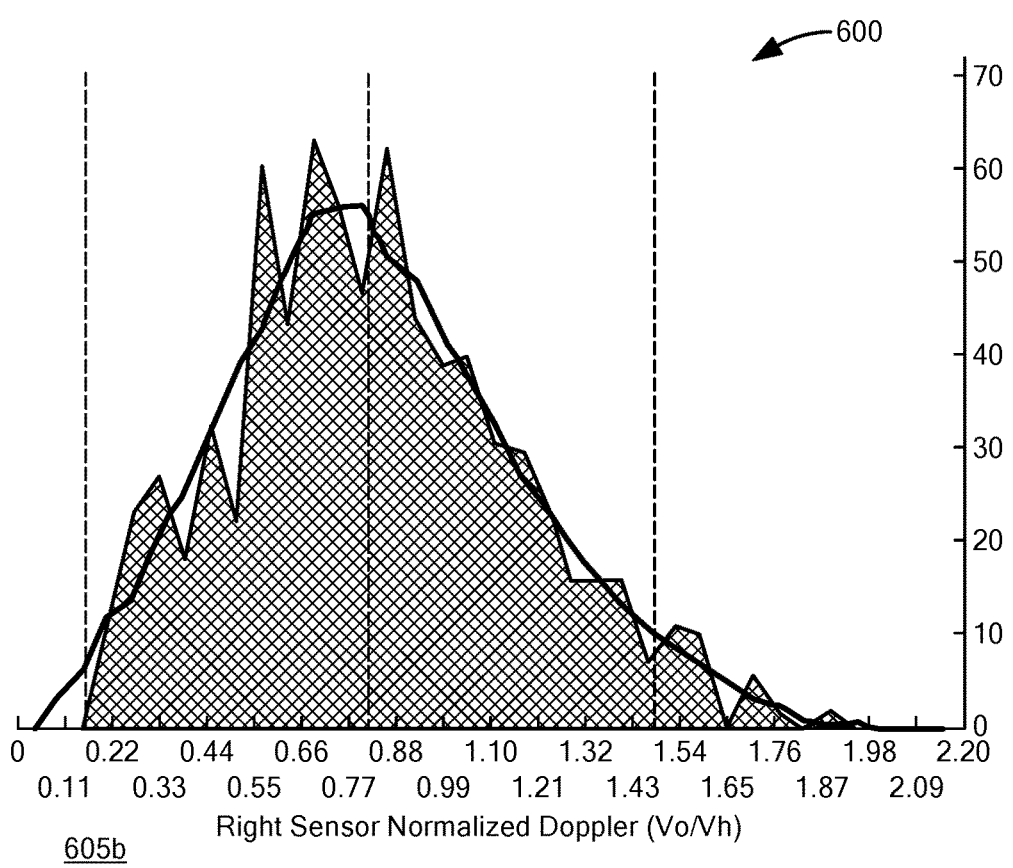
FIG. 6

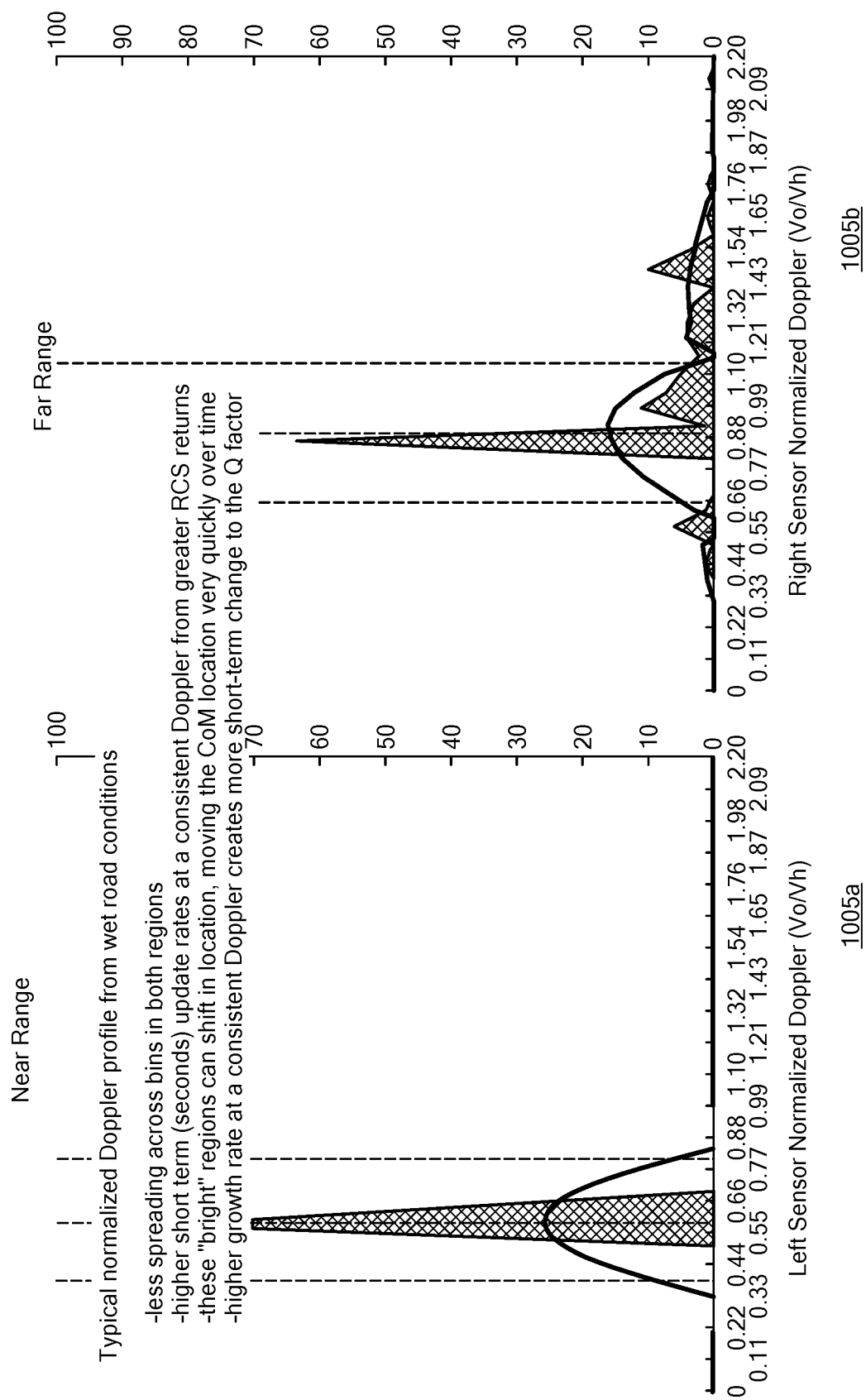

METHODS AND SYSTEMS FOR DETECTING ROAD SURFACE CONDITIONS

BACKGROUND

As is known in the art, roads which are wet and/or are covered with ice and/or snow have a surface friction which is relatively low compared with the surface friction of a road which is dry. Consequently, a vehicle travelling on a road having road surface conditions which result in relatively low surface friction, may require longer stopping distances (e.g. as compared to stopping distances required on a dry road), and may generally be at greater risk for experiencing vehicle slippage or the like while the vehicle is maneuvering (e.g. travelling around a corner, stopping, etc. . . . ). Thus, the existence of road surface conditions which result in relatively low surface friction can result in increased vehicle accidents.

It follows that the ability to detect or otherwise recognize road surface conditions could improve traffic safety by either providing an operator of the vehicle and/or a vehicle control system with such information. It would, therefore, be desirable to provide a system for use with vehicles, that can detect and classify road surface conditions in real-time to thus help improve traffic safety.

Prior art techniques attempt to determine road surface conditions by comparing ratios of powers received from vertically and horizontally transmitted waveforms. The techniques further determine coefficients of reflections to determine road surface conditions from said comparison. However, such techniques result in a large variation of results for rough asphalt road surface conditions.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Aspects of the present disclosure relate to methods and systems for detecting road surface conditions.

In one aspect, a method is provided for detecting road surface conditions. The method comprises transmitting one or more radio frequency (RF) signals at a road surface and receiving at least portions of RF signals reflected from the road surface. The RF reflections of the one or more transmitted RF signals are received in two or more receive channels. The received reflected signals are used to determine a road surface condition based upon a doppler signature of the received RF reflections.

The one or more RF signals can be transmitted using one or more sensors. The method can include directing the one or more RF signals in front of and/or behind a vehicle traveling on a road surface.

The method can further comprise controlling the transmission of the RF signals through one or more beams such that each beam has a field of view (FoV) of about 6 degrees. In other examples, the FoV is selected such that it is wide enough to accumulate enough data in the histograms and narrow enough to limit the spread of normalized doppler. Specifically, if the selected FoV is too large, unwanted doppler will be accumulated; if the FoV is too narrow, not enough data will be available to the sensor to accurately determine road surface conditions.

The method can also comprise generating an RF waveform for transmission via the one or more RF beams. The RF waveform can comprise a plurality of chirp signals (or more simply "chirps").

The method can further comprise performing Frequency Fourier Transform (FFT) processing of the RF reflections provided to each of the two or more receive channels. The method also comprises determining range, doppler, phase difference and magnitude based on the FFT processing. The method further comprises determining angle and azimuth of the RF reflections based on the phase difference. The method can further comprise filtering the received RF reflections to remove those RF reflections that originate outside the FoV.

The method can additionally comprise doppler shifting the filtered RF reflections to determine a doppler speed. The method also comprises generating a normalized doppler signal that is a function of the doppler speed and a vehicle speed. Further, the method comprises generating first and second histograms of the normalized doppler signal. The first histogram comprises data received from those RF reflections originating from a near region of the road surface. The second histogram comprises data received from those RF reflections originating from a far region of the road surface. The method also comprises determining the road surface condition based on a quality factor (Q-factor) of each histogram.

In another aspect, a road surface detector comprises an RF transmitter, an RF receiver, and one or more processors. The transmitter is configured to transmit one or more radio frequency (RF) signals at a road surface. The receiver is configured to receive at least portions of the RF signals reflected from the road. Such reflected RF signals are received through a receive antenna and provided to two or more receive channels. The one or more processors are configured to process the signals provided thereto to determine a road surface condition based upon a doppler signature of the received RF reflections.

The transmitter can comprise comprises one or more spaced apart sensors configured to transmit the one or more RF beams. The transmitter can further be configured to direct the one or more RF beams in front of and/or behind a vehicle traveling on a road surface. The transmitter can also be configured to control the transmission of the one or more beams such that each beam has a field of view (FoV) of 6 degrees. In other examples, the FoV is selected such that it is wide enough to accumulate enough data in the histograms and narrow enough to limit the spread of normalized doppler. Specifically, if the selected FoV is too large, unwanted doppler will be accumulated; if the FoV is too narrow, not enough data will be available to the sensor to accurately determine road surface conditions.

The transmitter can also be configured to generate an RF waveform for transmission via the one or more RF beams. The RF waveform comprises a plurality of chirps with each chirp having a transmit duration followed by a pause period. Each chirp can have a chirp slope that is a function of each chirp's frequency change over the transmit duration.

A single data cycle count can comprise sixty-four (64) chirps. Each data cycle count has a predetermined duration. The predetermined duration can be 45 ms.

The one or more processors can further be configured to perform Frequency Fourier Transform (FFT) processing of the RF reflections on each of the two or more receive channels. The one or more processors are also configured to determine range, doppler, phase difference and magnitude based on the FFT processing. The one or more processor are configured to determine angle and azimuth of the RF reflections based on the phase difference. The one or more processor can further be configured to filter the received RF reflections to remove those RF reflections that originate outside the FoV.

The one or more processors can additionally be configured to doppler shift the filtered RF reflections to determine a doppler speed. They can also be configured to generate a normalized doppler signal that is a function of the doppler speed and a vehicle speed. The one or more processors are also configured to generate first and second histograms of the normalized doppler signal. The first histogram comprises data received from those RF reflections originating from a near region of the road surface. The second histogram comprises data received from those RF reflections originating from a far region of the road surface. The one or more processors are configured to determine the road surface condition based a quality (Q) factor of each histogram.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6 is a histogram of normalized doppler signatures used by a radar sensor to detect a road surface condition according to embodiments described herein.

FIGS. 10 and 10A are example histograms that indicate a wet road condition according to embodiments described herein.

DETAILED DESCRIPTION

Vehicles can include collision avoidance systems designed to prevent or reduce a severity of a collision. Such systems typically use one or more of radar, laser (LIDAR), and cameras (employing image recognition) to detect an imminent crash. Some of these systems provide a warning to the vehicle's driver and other systems act autonomously without driver input (e.g. by braking, steering, or both). Collision avoidance by braking is appropriate at low vehicle speeds (e.g. below about 31 mph), while collision avoidance by steering may be more appropriate at higher vehicle speeds if vehicle travel lanes are clear. For example, autonomously braking a vehicle traveling below 31 mph may not be the best decision if the road surface is wet or snowy or otherwise has a surface friction which is relatively low compared with the surface friction of a road which is dry.

Embodiments of the present disclosure relate to methods and systems for determining a road surface condition with a radar sensor. The methods and systems generate "normalized" doppler histograms and utilize such normalized Doppler histograms to calculate multiple parameters. The parameters may include, but are not limited to, radar cross section (RCS), quality (Q)-factor, update rate of the histograms, and doppler spreading across bins of the histogram. The methods and systems described herein analyze the histograms and parameters to determine a road surface condition.

Figure 1:
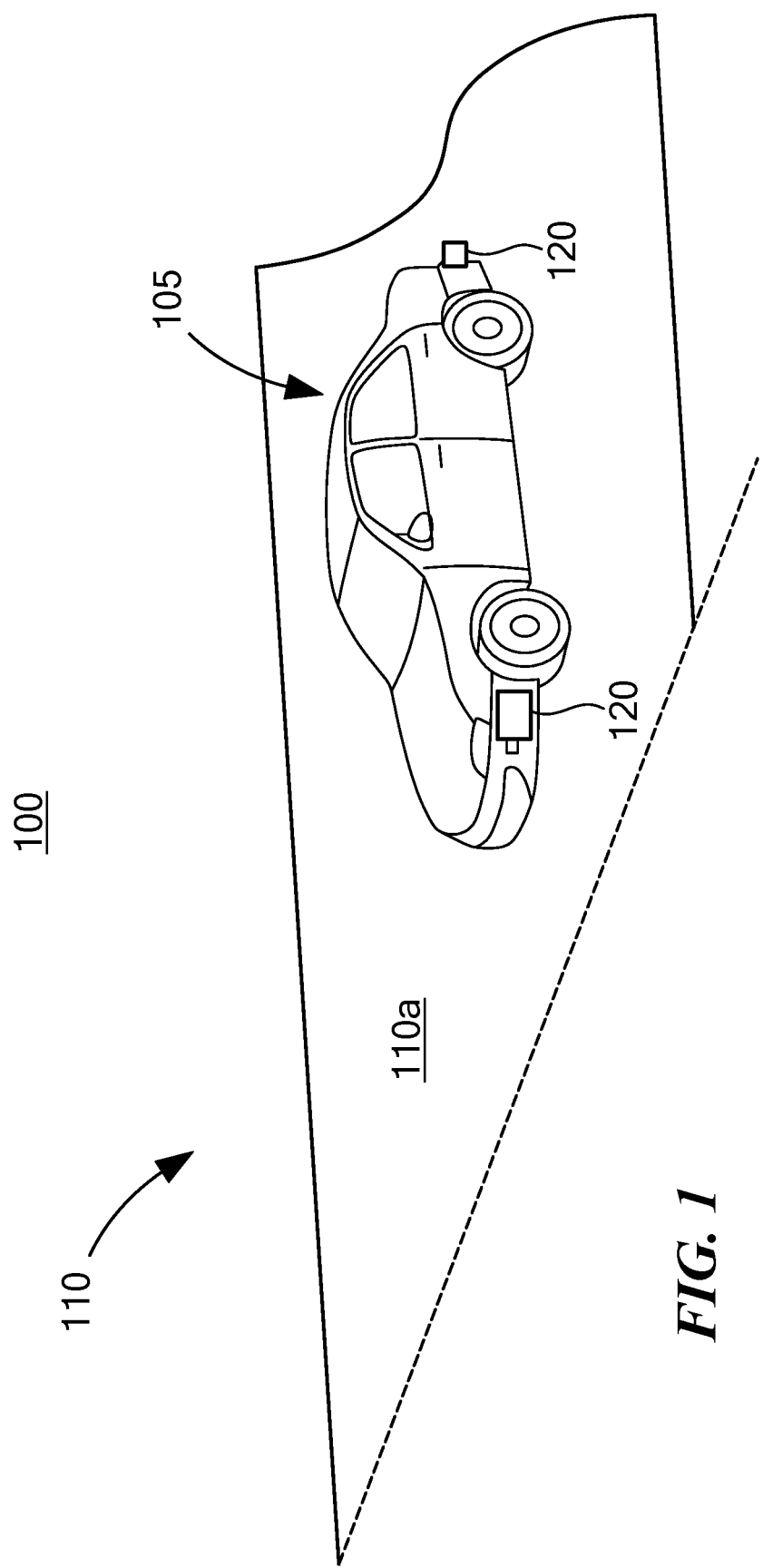
FIG. 1 illustrates an environment in which a vehicle is traveling on a road having a road surface condition.

FIG. 1 illustrates an environment 100 in which a vehicle 105 is traveling along a surface 110a of a road 110. The vehicle is equipped with one or more sensors 120 with at least one of the sensors 120 capable of detecting at least one environmental condition of the road 110 and in particular a condition of road surface 110a (i.e. a road surface conditions). In embodiments, at least one sensor can detect a plurality of road surface conditions including, but not limited to, dry, wet, icy, and/or snowy road surface conditions.

The detailed processing performed by a sensor capable of detecting road surface conditions will be described in detail herein below. Suffice it here to say, however, that sensor 120 transmits radar signals and uses doppler signatures from the transmitted radar signals to determine road conditions. In embodiments, the sensor may be provided as a multi-beam sensor which utilizes multiple chirp signals in a frequency modulated continuous wave (FMCW) system which may be the same as or similar to the type described in U.S. Pat. No. 7,071,868 assigned to the assignee of the present application, and which is incorporated herein by reference in its entirety. In embodiments, the FMCW sensor may utilize one or more transmit beams and two or more received beams. Those of ordinary skill in the art will appreciate how to select the number of transmit and receive beams required to meet the needs of a particular application.

Similarly, after reading the disclosure provided herein, one of ordinary skill in the art will appreciate how to select a frequency or a range of frequencies over which sensor 120 operates. In embodiments, a sensor 120 capable of detecting road surface conditions may operate at a transmit frequency of about 24 GHz or about 79 GHz. Other frequencies or ranges of frequencies may, of course, also be used.

Sensors 120 can be disposed on any portion of vehicle 105 which allows the sensor to direct a radio frequency (RF) transmit signal toward road surface 110a such that at least portions of the RF signals reflect off road surface 110a and can be received via receive antenna in sensor 120. Such signals are subsequently from the receive antenna to a receiver coupled to the receive antenna. In some embodiments, it has been found that sensors 120 are preferably positioned to allow radar beams to generate a large doppler signature (and ideally, the largest possible doppler signature). In accordance with one aspect of the concepts described herein, it has been recognized that for road surface conditions, the greatest doppler radar signature for a moving vehicle is behind (and ideally directly behind) or in front of (and ideally in front of) the vehicle. In one example, the sensor 120 determines road conditions based on short-term, near-range integrated statistics of the doppler signature of the road surface behind or in front of the vehicle 105.

Figure 7:
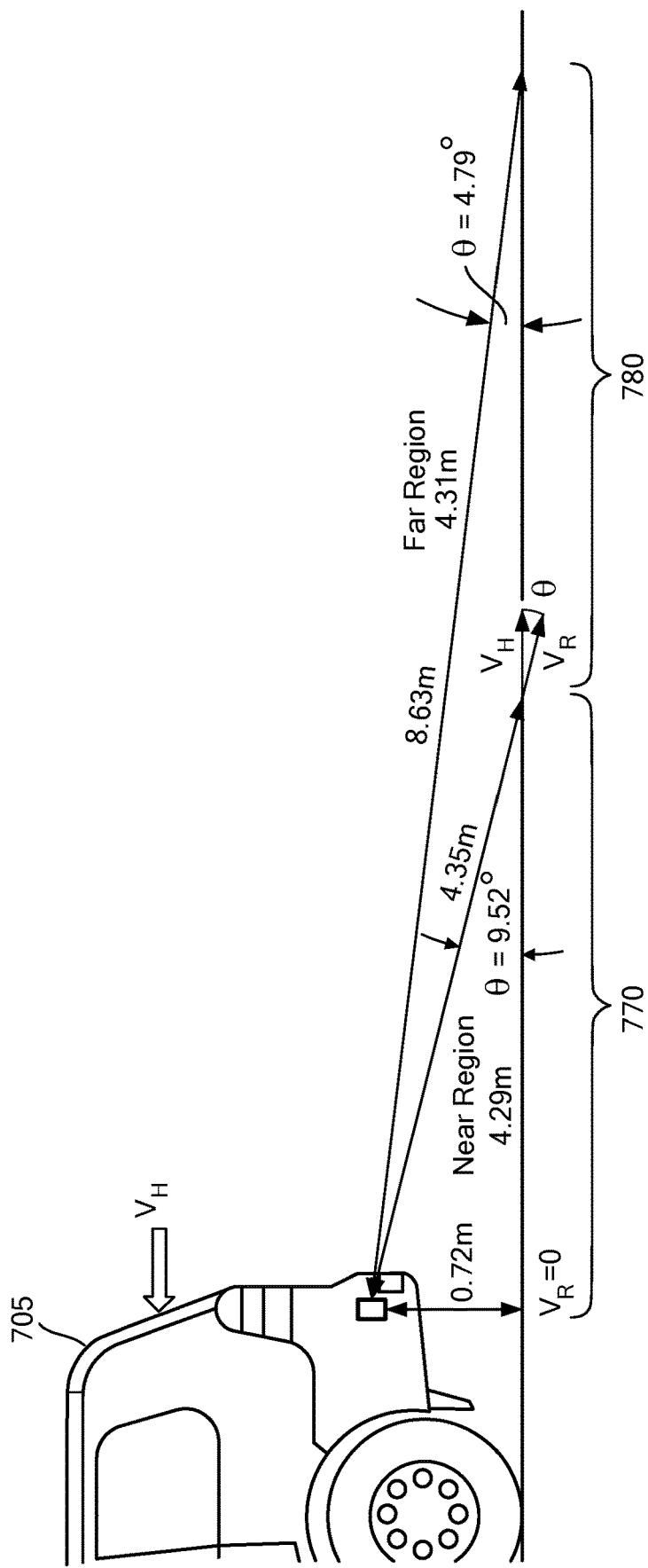
FIG. 7 is a diagram of a vehicle having a sensor disposed thereon which illustrates near and far regions from which the sensor analyzes doppler signatures to detect a road surface condition according to embodiments described herein.

Based on decay rates of doppler histograms, statistical analysis to determine a road surface condition is based on about 3 seconds of data collection. The data is filtered to process radar returns coming from the road surface in the near range either directly behind or in front of the host, where the Doppler has a very deterministic behavior for dry vs. wet conditions. The near range is within the 0.5 to 9 meter window, with this total near region divided again into 2 small regions (near/far) at a threshold of about 4.5 meters, which is illustrated in FIG. 7

It should, of course, also be appreciated that vehicle 105 can also include a collision avoidance system (not shown) that uses road surface condition information when making decisions related to avoid collisions. The vehicle can also include driver assistance systems (not shown) that use road surface condition information to adjust vehicle driving parameters (e.g., slowing cruise control speeds if the road becomes wet).

Although two sensors 120 capable of detecting road surface conditions are shown in FIG. 1, after reading the disclosure provided herein, a skilled artisan understands that one or more than two sensors 120 can be used to detect road surface conditions.

Figure 2:
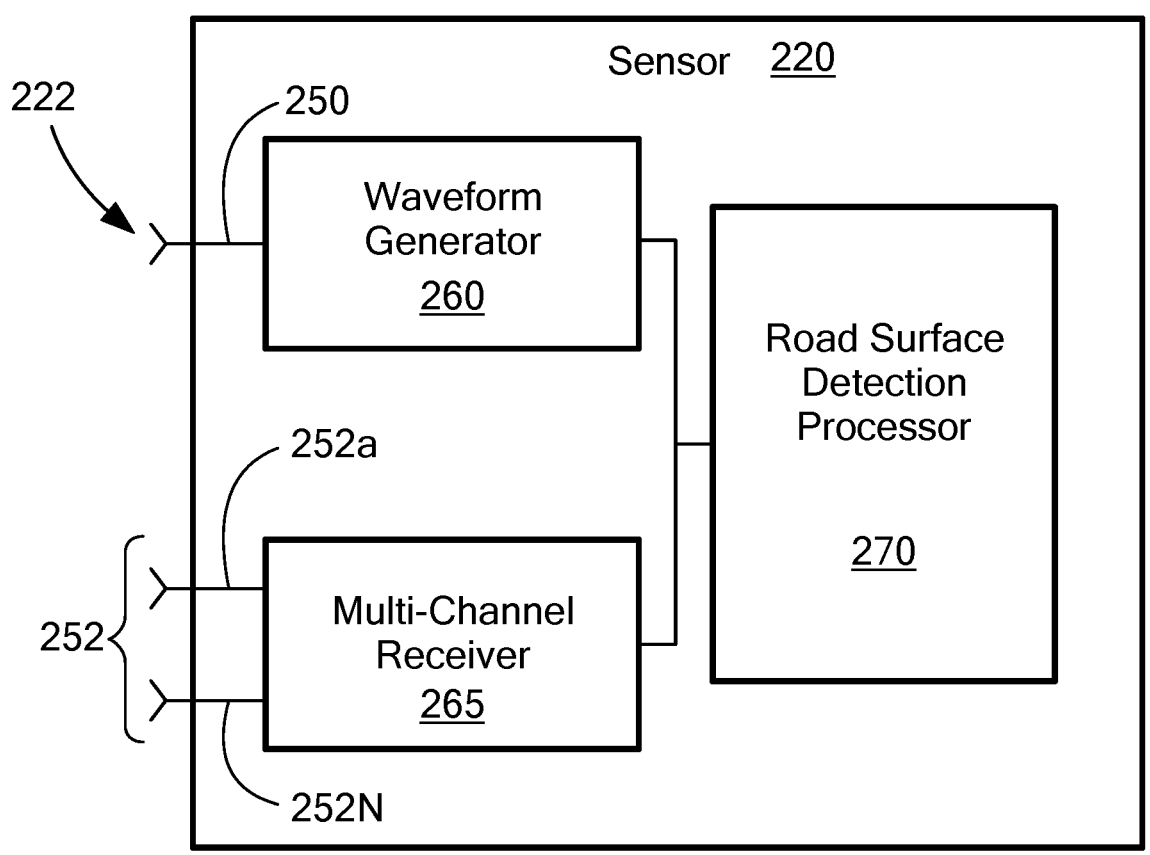
FIG. 2 is a block diagram of a radar sensor according to embodiments described herein.

Referring now to FIG. 2, a sensor 220 capable of detecting road surface conditions includes a transmit antenna 222 coupled to a transmit signal path which includes a waveform generator 260. Transmit antenna 222 may include one or more antenna elements 250 and may be capable of generating one or more transmit beams through which one or more RF signals generated by transmit path and waveform generator 260 are transmitted (i.e. are emitted) via transmit antenna 222.

Sensor 220 further includes a receive antenna 252 coupled to a multi-channel receiver 265. Receive antenna 252 may include one or more antenna elements 252a-252N and may be capable of generating one or more receive beams through which at least portions of one or more RF signals reflected from a road surface (e.g. road surface 110a in FIG. 1) may be received.

Signals received by receive channel 252 are coupled to an input of a multi-channel receiver 265. Multi-channel receiver 265 receives the signals provided thereto, appropriately processes the signals and provides an output signal to a road surface detection processor 270.

In one embodiment, the waveform generator 260 generates a waveform (e.g., the waveform 400 of FIG. 4) and transmitter 250 transmits the waveform toward a road surface 110a (e.g. the road surface of FIG. 1) via transmit antenna 222.

Portions of the transmitted signal reflect off the road surface and are received by multi-channel receiver 265 via receive antenna. The multi-channel receiver 265 preferably includes two or more processing channels for processing the reflected RF signals. The multi-channel receiver 265 and signal processor(s) 270 processes the radar response signals to detect a road surface's condition according to the method 500 of FIG. 5.

Figure 3:
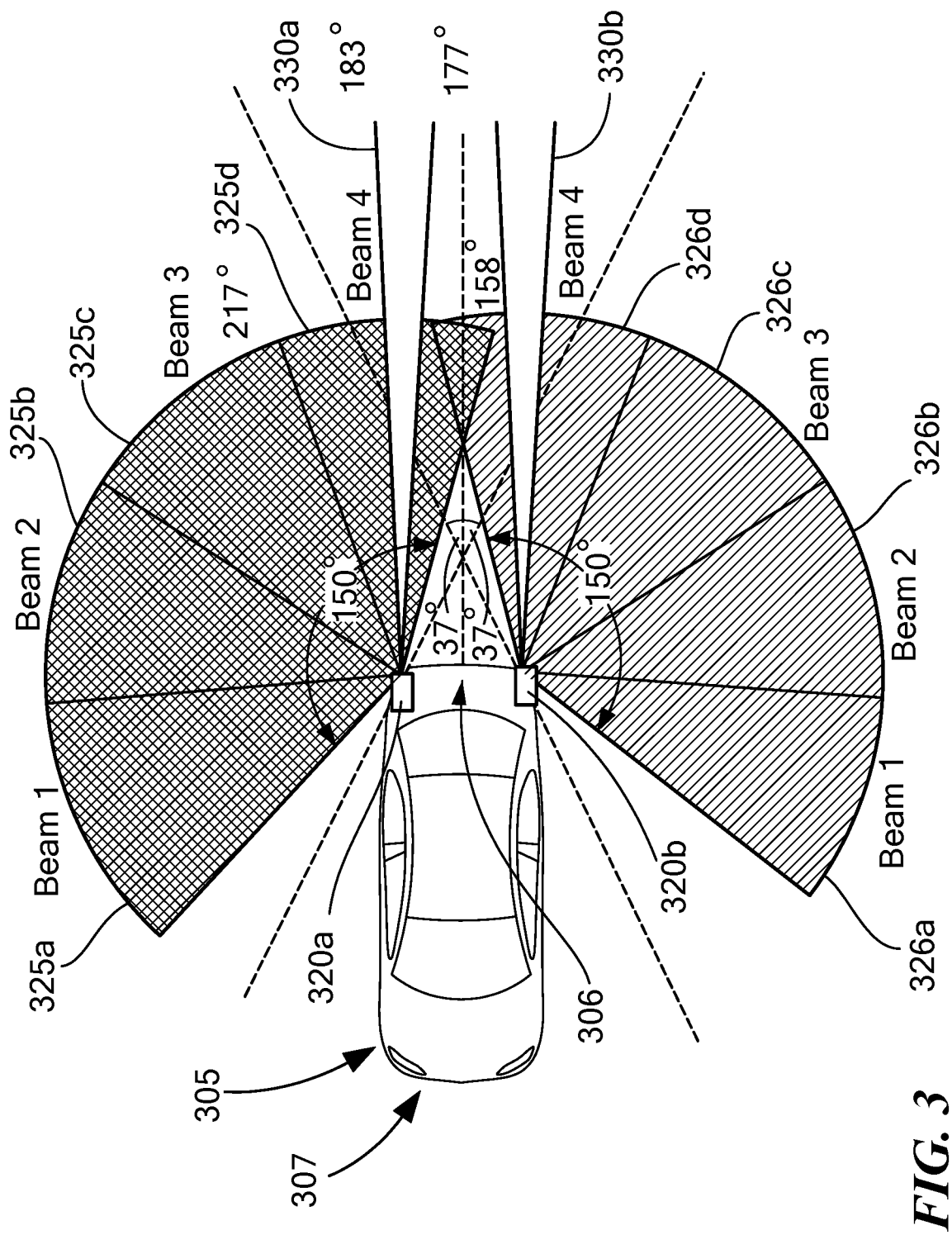
FIG. 3 illustrates a vehicle having two sensors disposed thereon with each sensor capable of detecting a road surface condition according to embodiments described herein.

FIG. 3 illustrates a vehicle 305 that is equipped with two radar sensors 320a, 320b configured to detect road surface conditions. Although two sensors are shown, after reading the disclosure provided herein, a skilled artisan understands that the vehicle 305 can be equipped with one sensor or more than two sensors that are configured to detect road surface conditions. The radar sensors 320a, 320b are respectively positioned on right and left sides of a rear bumper area 306 of the vehicle 305 (with right and left here defined with respect to a person standing behind the rear of the vehicle and facing the front of the vehicle—i.e. facing the direction of front bumper 307).

Those of ordinary skill in the art will appreciate that the sensors can be disposed anywhere on the vehicle where they are able to obtain doppler signatures from a road surface (e.g. road surface 110a in FIG. 1). The sensors are preferably positioned on the vehicle in a location which allows the sensor to obtain the a relatively large doppler signature from the road surface (and ideally, which allows the sensor to obtain the largest possible doppler signature from the road surface). For a moving vehicle, such a preferred location is in a front bumper area 307 and/or a rear bumper area 306 of the vehicle 305.

Figure 3A:
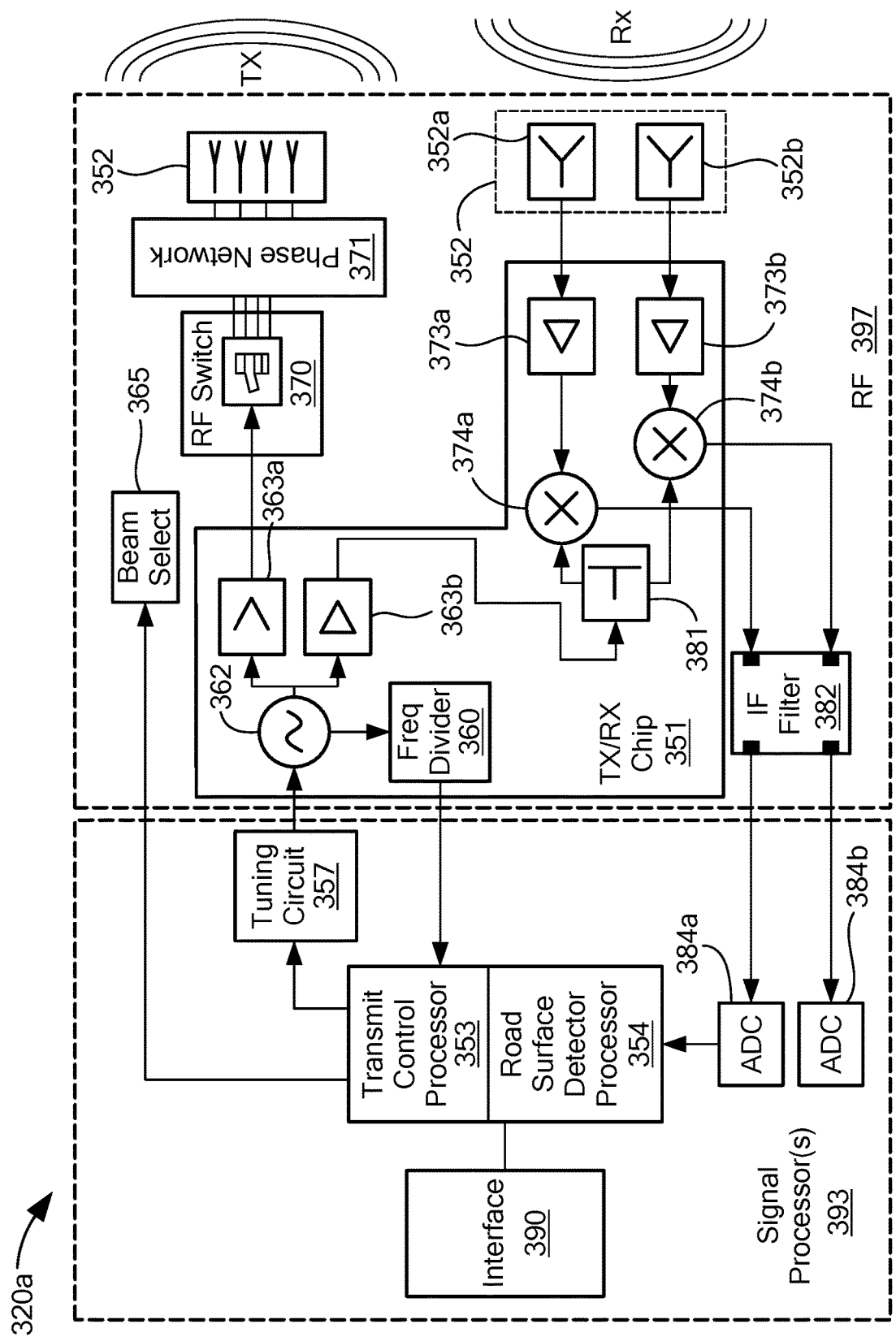
FIG. 3A is a block diagram of another road sensor according to embodiments described herein.

Referring briefly to FIG. 3A, and taking sensor 320a as representative of sensors 320a, 320b, in one illustrative embodiment, radar sensor 320a is capable of switching between a plurality of, here four (4), transmit beams formed by a transmit antenna. It should be understood that the transmit beams may be used for any number of vehicle systems including vehicle control systems including, but not limited to: collision avoidance systems, object detection systems or other vehicle systems.

Referring again to FIG. 3, in this illustrative embodiment one of the four beams, here the fourth beams 325a, 326d, of each respective radar sensor are used to detect road surface conditions. Each of the fourth beams have a field of view (FoV) that covers an angular range extending from about 158 degrees to about 217 degrees (as shown in FIG. 3). In other embodiments, some sensors may utilize only a single beam which may be configured to have FoVs extending from about 177 degrees to about 183 degrees (i.e., a beam width of six (6) degrees) as shown in FIG. 3 and indicated as 330a-b. In other examples, the FoV is selected such that it is wide enough to accumulate enough data in the histograms and narrow enough to limit the spread of normalized doppler. Specifically, if the selected FoV is too large, unwanted doppler will be accumulated; if the FoV is too narrow, not enough data will be available to the sensor to accurately determine road surface conditions.

Referring back to FIG. 3A, the representative sensor 320a comprises a transmit control processor 353, TX/RX chip 351, and road surface detector processor 354. The transmit control processor 353 generates control signals for transmitting a radar transmit waveform (e.g., the waveform 400 of FIG. 4). The tuning circuit 357 receives the control signals and provides a tuning signal to an oscillator 362 (e.g., a voltage-controlled oscillator (VCO)) of the T X/RX chip 351. The VCO 365 generates a corresponding chirp signal from the tuning signal. A power amplifier 363a amplifies the transmission chirp signal and RF switch 370 selects a transmit beam (e.g., the beam 325d of FIG. 3) for transmitting the transmission chirp signal. A phase network 371 introduces a phase shift to the antenna elements such that the antenna forms a desired antenna beam through which is transmitted the transmission chirp signal.

A receive antenna 352 comprising antenna elements 352a, 352b then receives radar response signals (i.e., RF reflections of the transmission chirp signal). Antenna 352 is coupled to a dual-channel receiver. Each receiver channel comprises respective low noise amplifiers (LNAs) 373a, 373b and mixers 374a, 374b for processing the radar response signals as is generally known (i.e. the LNAs 373a, 373b amplify the radar response signals provided thereto while mixers 374a, 374b mix (or down convert) the amplified radar response signals with a local oscillator frequency signal provided by power amplifier 363b and signal splitter 381. The local oscillator (LO) frequency signal is equivalent to the transmission chirp signal. Mixers 374a, 384b thus produce an intermediate frequency (IF) signal which is provided to an IF filter 383. The down converted, IF-filtered radar response signals are then converted to digital signals (e.g. a digital bit stream) by analog-to-digital converters (ADCs) 384a, 384b. The road surface detector processor 354 processes the digital signals to determine a condition of a road surface (e.g., the road surface 110a of FIG. 1). The digital signal processor 354 can determine a condition of the road surface according to the method 500 of FIG. 5.

Figure 4:
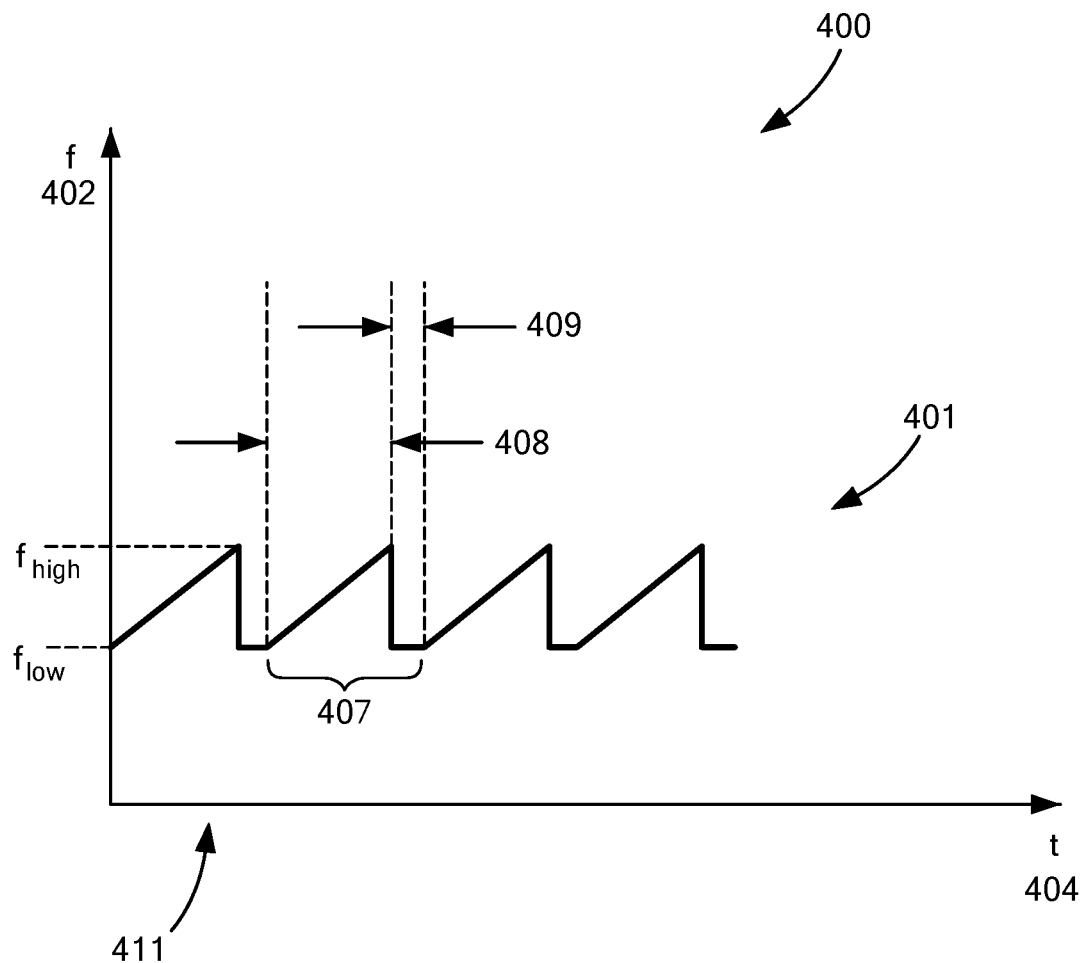
FIG. 4 is a plot of transmit frequency vs. time which illustrates transmit signal waveforms provided by a sensor capable of detecting road surface conditions.

Referring now to FIG. 4, an example radar transmit waveform 400 used to detect road surface conditions comprises a plurality of chirp signals 401 (or more simply "chirps). The chirp waveform 400 is presented as a graph 411 that plots frequency 402 over time 404. In this example, a single transmission waveform comprises sixty-four (64) chirps. The time to transmit the entire waveform can be forty-five (45) milli-seconds. After reading the disclosure provided herein, one of ordinary skill in the art will appreciate that any number of chirps transmitted over any time period may also be used.

Each of the chirps 401 is transmitted during a transmission window 407 that comprises a transmit time period (or duration) 408 followed by a pause time period (or duration) 409. Accordingly, each of the chirps 401 has a slope that is a function each chirp's frequency change over the transmit duration 409.

A radar sensor (e.g., the radar sensor 220 of FIG. 2) processes return signals of the waveform 400 to detect a road surface condition as further described herein. Accordingly, the waveform 400 is designed to have a chirp linearity, number of chirps, and chirp slope to enable the radar sensor to resolve doppler.

Figure 5:
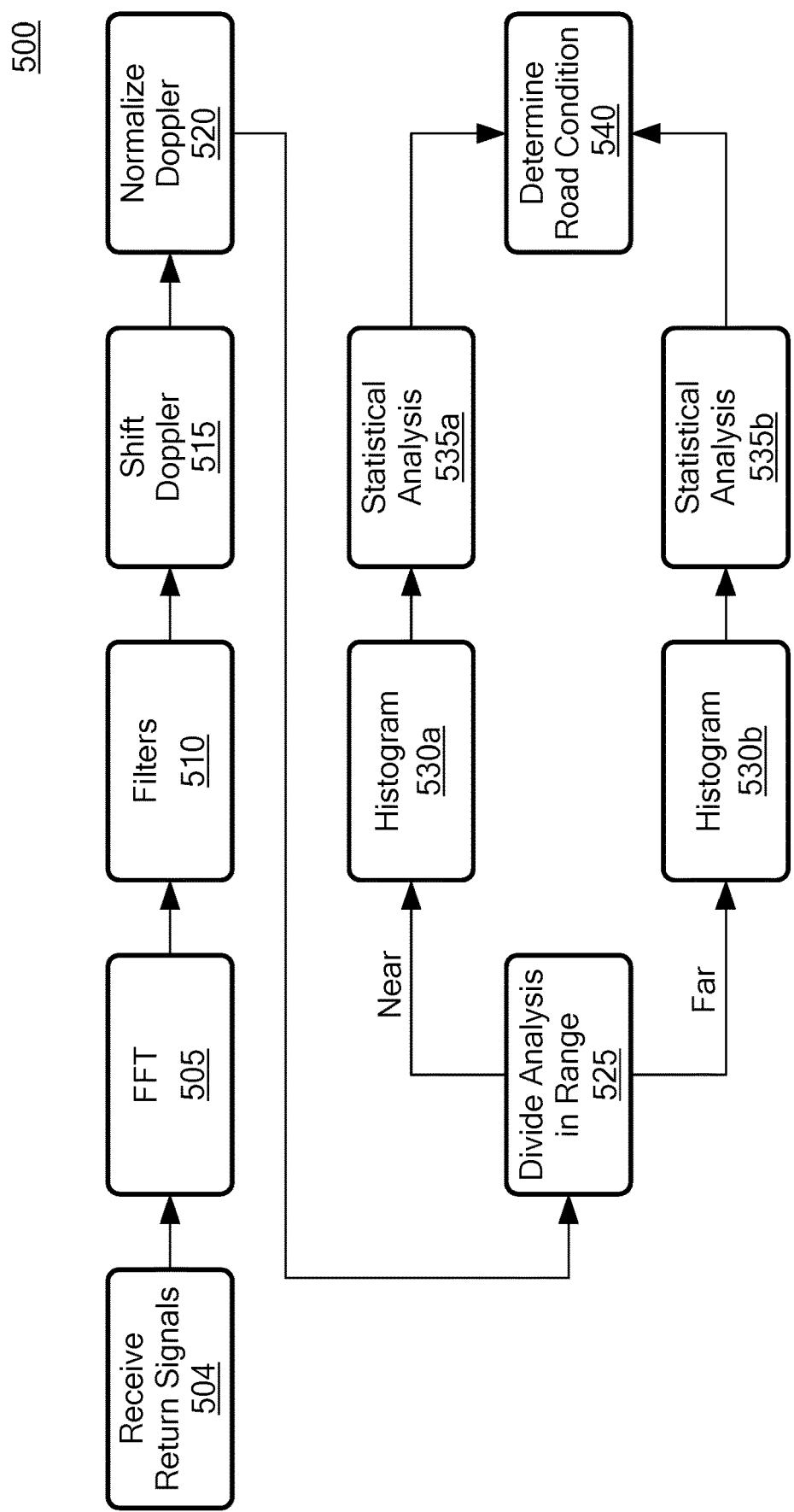
FIG. 5 is a flow diagram of a method for detecting a road surface condition according to embodiments described herein.

Referring now to FIG. 5 a method 500 for detecting a road surface condition begins as shown in processing block 504 in which a sensor receives one or more RF return signals. Such return signals are processed by an RF receiver (e.g. the RF receiver described above in conjunction with FIG. 3A) as is generally known. As noted above, the receiver receives radar return signals via two processing channels (e.g., the processing channels of the multi-channel receiver 265 of FIG. 2). The receiver appropriately down converts and digitizes (e.g. via a downconverter and analog to digital converter) the signals provided at the receiver input and provides a digital signal (e.g. a stream of bits) at an output thereof. Next, as shown in processing block 505, a Fast Fourier Transform (FFT) is performed on the digitized radar response signals provided by each of the processing channels. Processing block 505 thus produces FFT response signals that are, at processing block 510, filtered such that data is restricted to be sourced directly from those response signals that originate directly behind host.

The method 500 can include implementing one or more filters that filter out signals associated with zero (0) doppler. Additionally, a filter removes those signals originating from outside a limited FoV (e.g., the FoV 330a, 330b of FIG. 3). For example, the filter determines an angle of arrival based on a phase difference of radar return signals received at each of two receiving elements (e.g., elements 225a-b of FIG. 2). Thus, those signals having an angle of arrival outside the limited FoV are eliminated (i.e. are not used in the generation of histograms as will be described in detail further below).

At processing block 515, the method 500 includes doppler shifting the filtered RF response signals to limit doppler ambiguity and generate a doppler shifted signal. The doppler is shifted based on a Doppler Nyquist and a Doppler Sample Rate because the doppler, due to static infrastructure along a road, wraps around edges of the FFT signal. Accordingly, doppler is shifted at an integer times the Doppler Sample Rate based on a vehicle speed.

The doppler sample rate can be defined as shown in Equation (1):

$$F_{pri} \cdot \lambda/2 = \lambda/((T_{chirp} + T_{pause}) \cdot 2), \qquad (EQ. 1)$$

in which:

$F_{pri}$ represents the frequency of the pulse repetition interval;

$\lambda$ is a wavelength of the transmit signal frequency;

$T_{chirp}$ is a chirp transmission duration; and $T_{pause}$ is a pause period (i.e. a period of time) following each chip transmission duration.

The Doppler Nyquist is ½* Doppler Sample Rate. Accordingly, those radar return signals originating from behind or in front of the vehicle should normalize to a value of one (1) because the road surface speed corresponds to the vehicle's speed. When road conditions change, the behavior of doppler signature changes e.g. (wet vs dry vs snow).

Processing then proceeds to processing block 520 which includes normalizing the doppler shifted signal based upon the vehicle's speed. Specifically, the doppler shifted signal is divided by the speed of the vehicle to generate a normalized doppler signal.

Processing then proceeds to processing block 525 which includes dividing the normalized doppler signature signal based on a location source of the received radar return signals. In one example embodiment, the signal is divided into near range and far range signals. The near range signals include data corresponding to the radar response signals emanating from a first region proximate the vehicle. The far range signals include data corresponding to the radar response signals emanating from a second region further away from the vehicle than the first region. The near and far regions are further described with respect to FIGS. 6-7.

For each of the near and far region signals, the method 500, at 530a-b, includes generating near range histograms and far range histograms that identify doppler spread within each of the regions. For example, the normalized doppler data is integrated into a histogram by counting+1 for every data point taken from the FFT that passes a magnitude threshold. An x-axis of the histogram is the normalized doppler and the y-axis is a current count for that normalized Doppler bin collection. Each histogram is decayed to maintain a refresh rate of about 3 seconds of data. The method 500, at 535a-b, includes performing statistical analysis on each of the histograms to determine a Q-factor for each histogram. A higher Q value represents a lower noise component, resulting in a predictable outcome. Based on the Q-factor, the method 500, at 540, includes determining a road surface condition.

Referring now to FIG. 6, an example histogram 600 of normalized doppler signals generated at, e.g., step 520 of method 500. As illustrated, the histogram 600 includes a first histogram region 605a and a second histogram region 605b. Each region corresponds to locations where there is a separation of data. The separation of data can be based on regions from which radar return signals originate. The first histogram region 605a can correspond to data originating from a first region (e.g., a region proximate the vehicle). The second histogram region 605b can correspond to data originating from a second region (e.g., a region farther away from the vehicle than the first region).

Referring now to FIG. 7, first and second regions, a so-called "near" region 770 and a so-called "far region" 780 from which normalized doppler signatures are analyzed to determine a road surface condition. A vehicle 704 is equipped with a sensor 720 capable of detecting road surface conditions (e.g., the radar sensor 220 of FIG. 2). Sensor 720 transmits a waveform (e.g., the waveform 400 of FIG. 4), and processes waveform radar return signals (e.g., according to method 500 of FIG. 5). For example, the detector 720 generates a histogram (e.g., the histogram 600 of FIG. 6) and identifies regions where there is a separation of data (e.g., the first histogram region 605a of the second histogram region 605b of FIG. 6). Specifically, the first histogram region 605a corresponds to data originating from radar return signals in the near region 770. The second histogram region 605b corresponds to data originating from radar return signals in the near region 780. Each of the first and second histograms 605a-b are then processed according to method 800 of FIG. 8.

Figure 8:
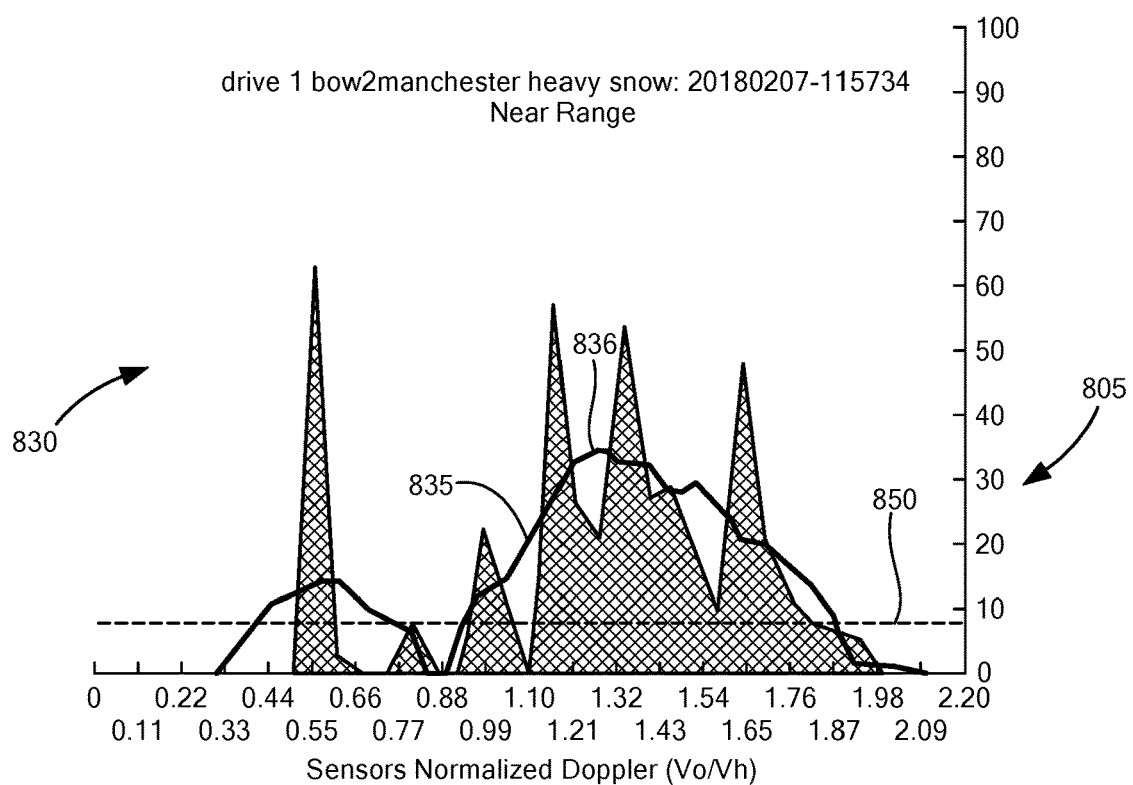
FIGS. 8-8B are a series of histograms which illustrate a method of processing histograms to detect a road surface condition according to embodiments described herein.
Figure 8A:
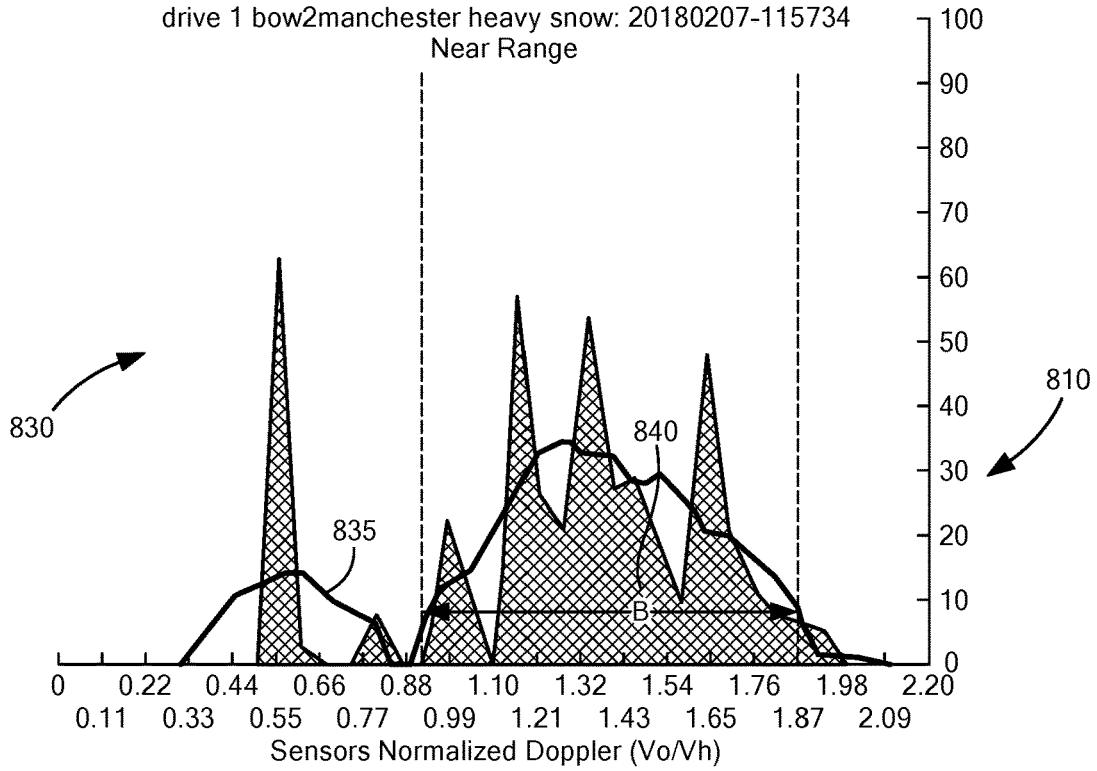
Figure 8B:
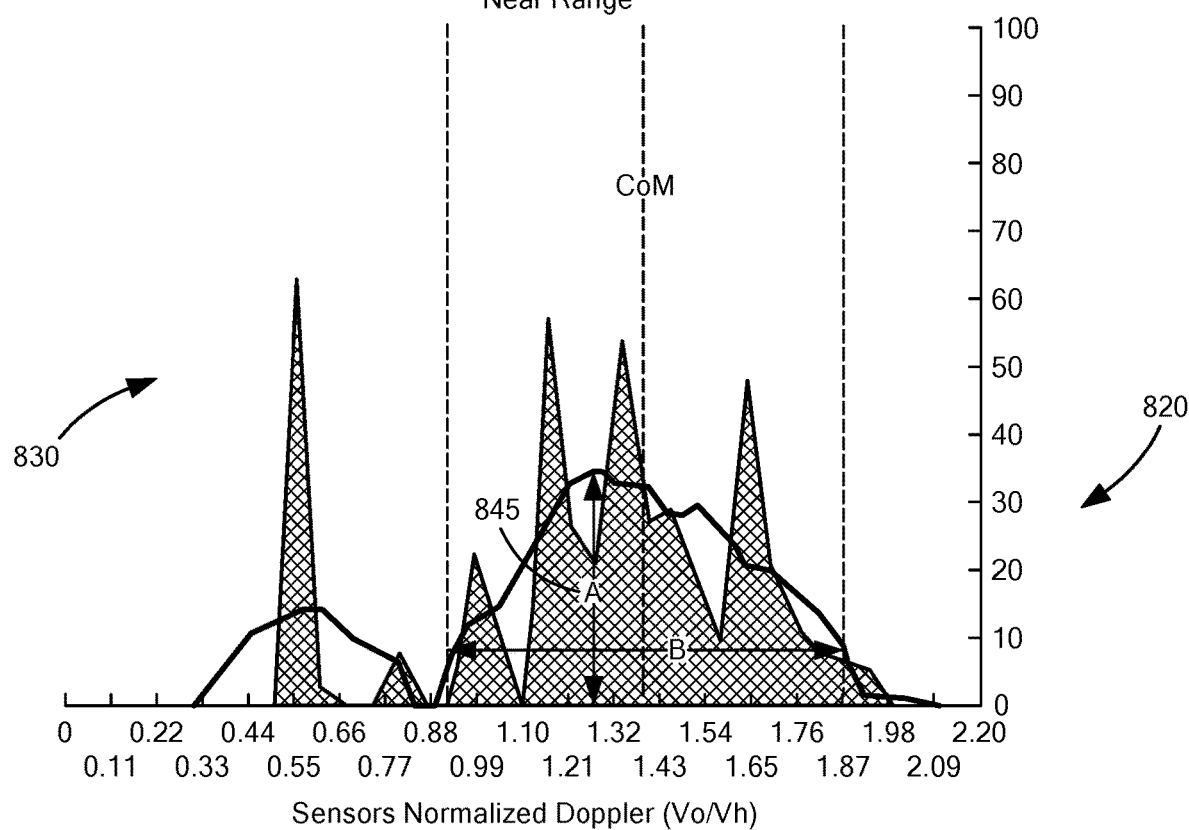

FIGS. 8-8B are a series of plots which illustrate the statistical analysis that takes place in processing blocks 535a, 535b of the method 500 of FIG. 5. As shown in FIG. 8, a generated histogram 830 has a series of peak regions and a series of valleys. The histogram data is "smoothed" to generate smoothed curve 835. The smoothed curve 835 can be generated using a variety of known smoothing techniques including but not limited to Savitky Golay windowing.

As shown in FIG. 8, the method further includes locating a highest peak 836 of the smoothed curve 835 within the histogram 830. This may be accomplished, for example, by using a Center of Mass (CoM) computation, and then averaging of all non-zero histogram data points (e.g., data above non-zero line 850). Other techniques may, of course, also be used.

Referring now to FIG. 8A, a baseline distance, B, of a portion of the smoothed curve 835 that included the highest peak 836 is then determined. The baseline distance corresponds to a distance between the first intersection points of smoothed curve 835 with the line 850 that are to the left and right of the highest peak 836.

Referring now to FIG. 8B, at 820, the method determines a peak distance A that is a distance between the highest peak 836 and the line 850. A Q-factor of the histogram data is then determined as A divided by B (i.e. A/B).

Referring momentarily back to FIG. 5, the method 500, at 540, includes determining the road condition based on the Q-factor. The method 500, at 540, includes looking at the relationship between Q-factor of each histogram region (i.e., near and far). The method 500, at 540, can also include looking at the $1^{st}$ derivative of the Q factor to see how dynamic the behavior is (i.e., change over time). For example, significant change can indicate a wet road condition.

Figure 9:
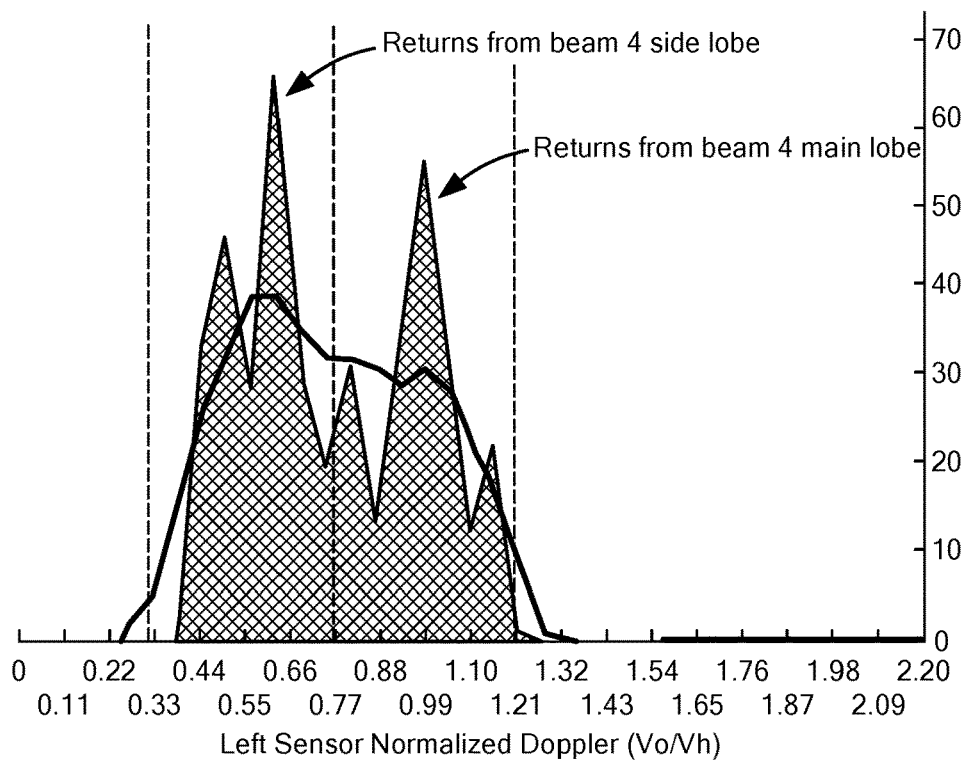
FIGS. 9 and 9A are example histograms that indicate a dry road condition according to embodiments described herein.
Figure 9A:
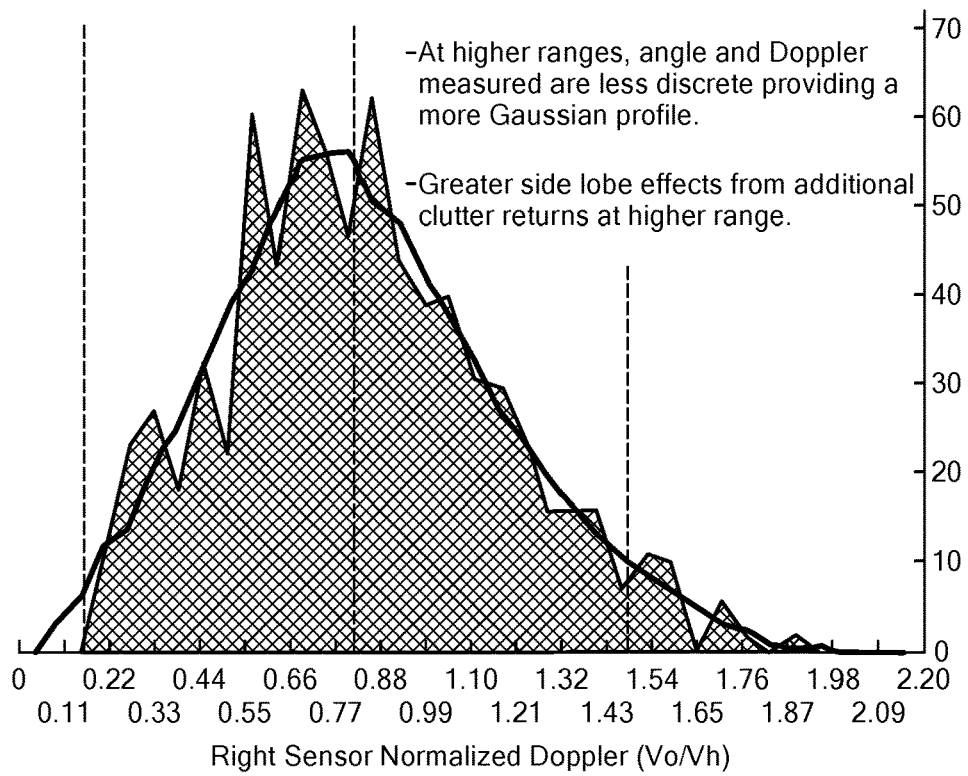

Referring now to FIGS. 9 and 9A, a near region histogram 905a (FIG. 9) and a far region histogram 905b (FIG. 9A) depict a dry road condition. The histograms 905a, 905b show some spreading across bins of the histograms and show a slow growth rate and minimal short-term change to Q-factor over time.

Referring now to FIGS. 10 and 10A, a wet road condition produces a near region histogram 1000a (FIG. 10) and a far region histogram 1000b (FIG. 10A). When a road is wet, packets of water in crevices or cracks of the road surface cause the behavior of doppler in the near and far regions to vary significantly. Accordingly, the histograms 1000a-b have a higher Q factor and present more dynamic Q-factor change over time as compared to a dry road condition.

Figures 11, 11A:
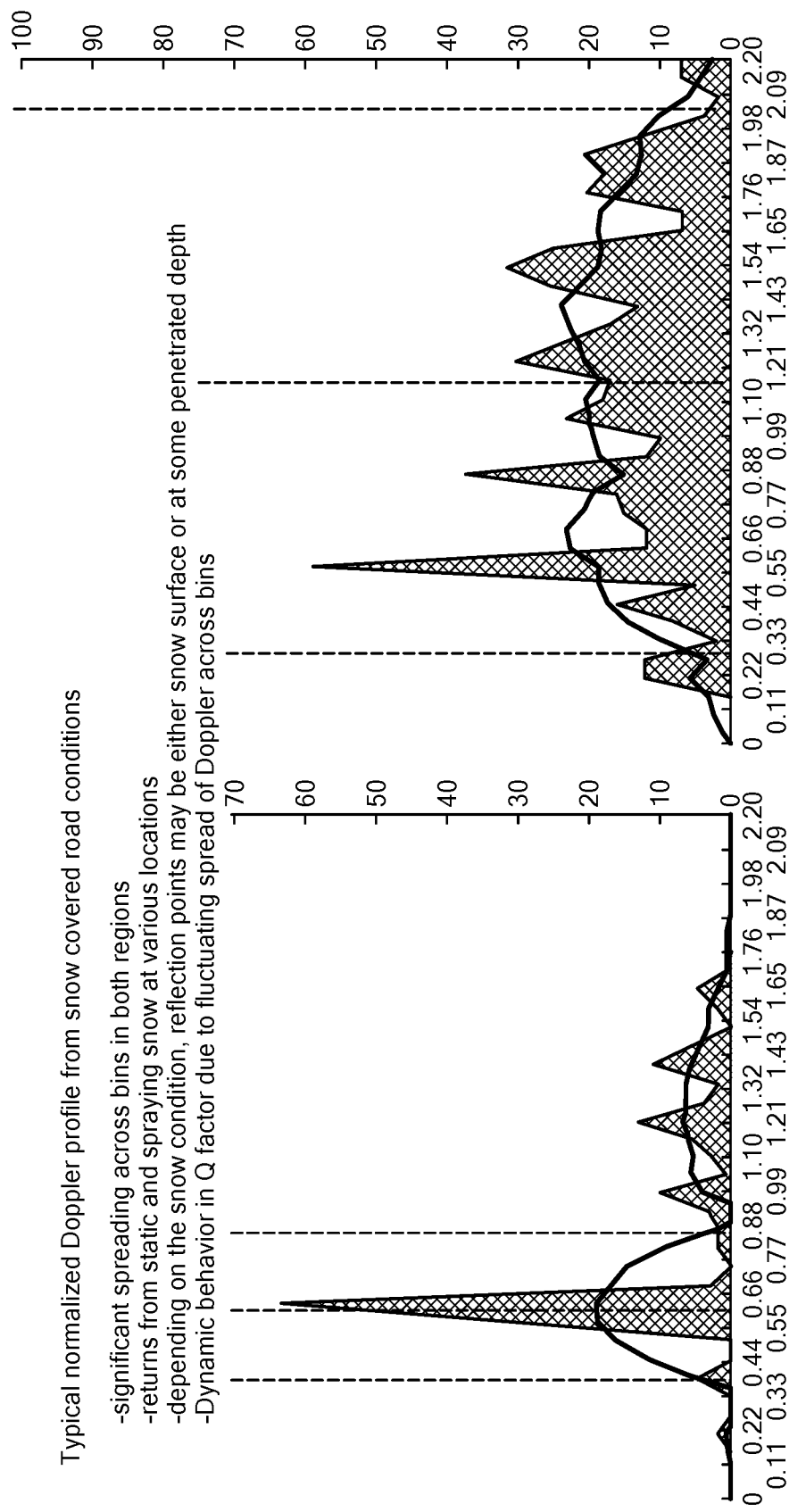
FIGS. 11 and 11A are example histograms that indicate snow covered road conditions according to embodiments described herein.

Referring now to FIGS. 11 and 11A, a snow covered road condition produces a near region histogram 1100a (FIG. 11) and a far region histogram 1100b (FIG. 11A). The near and far region histograms 1100a-b demonstrate dynamic Q-factor behavior due to fluctuating spread of doppler across the histogram bins.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for detecting road surface conditions, the method comprising:
   transmitting one or more radio frequency (RF) beams at a road surface;
   receiving RF reflections of the one or more transmitted RF beams at two or more receive channels;
   determining a road surface condition based on a doppler signature of the received RF reflections;
   performing Frequency Fourier Transform (FFT) processing of the RF reflections on each of the two or more receive channels;
   determining range, doppler, phase difference and magnitude based on the FFT processing;
   determining angle and azimuth of the RF reflections based on the phase difference;
   filtering the received RF reflections to remove those RF reflections that originate outside the FoV;
   determining a doppler speed from the filtered RF reflections;
   generating a normalized doppler signal that is a function of the doppler speed and a vehicle speed; and
   generating first and second histograms of the normalized doppler signal;
   wherein the first histogram comprises data received from the RF reflections originating from a near region of the road surface and the second histogram comprising data from the RF reflections originating from a far region of the road surface, and
   determining the road surface condition based a quality factor (Q-factor) of each histogram.

2. The method of claim 1 further comprising transmitting the one or more RF beams using one or more sensors.

3. The method of claim 2 further comprising directing the one or more RF beams in front of and/or behind a vehicle traveling on a road surface.

4. The method of claim 1 controlling the transmission of the one or more beams such that each beam has a field of view (FoV) selected to limit a spread of normalized doppler and provide a statistical amount of data sufficient for an accurate determination of a road surface condition.

5. The method of claim 4 further comprising generating an RF waveform for transmission via the one or more RF beams, the RF waveform comprising a plurality of chirps with each chirp having a transmit duration.

6. The method of claim 5 further comprising generating each chirp to have a slope that is a function frequency change over the transmit duration.

7. The method of claim 5 wherein a single data cycle count comprises 64 chirps.

8. A road surface condition detector comprising:
   a transmitter configured to transmit one or more radio frequency (RF) beams at a road surface;
   a receiver configured to receive RF reflections of the one or more transmitted RF beams at two or more receive channels;
   one or more processors configured to:
   determine a road surface condition based on a doppler signature of the received RF reflections, perform Frequency Fourier Transform (FFT) processing of the RF reflections on each of the two or more receive channels;

determine range, doppler, phase difference and magnitude based on the FFT processing;

determine angle and azimuth of the RF reflections based on the phase difference;

filter the received RF reflections to move those RF reflections that originate outside the FoV;

determine a doppler speed from the filtered RF reflections;

generate a normalized doppler signal that is a function of the doppler speed and a vehicle speed;

generate first and second histograms of the normalized doppler signal;

wherein the first histogram comprises data received from the RF reflections originating from a near region of the road surface and the second histogram originating from a far region of the road surface; and determine the road surface condition based a quality (O) factor of each histogram.

9. The detector of claim 8 wherein the transmitter comprises one or more spaced apart sensors configured to transmit the one or more RF beams.

10. The detector of claim 8 wherein the transmitter is further configured to direct the one or more RF beams in front of and/or behind a vehicle traveling on a road surface.

11. The detector of claim 10 wherein the transmitter is further configured to control the transmission of the one or more beams such that each beam has a field of view (FoV) selected to limit a spread of normalized doppler and provide a statistical amount of data sufficient for an accurate determination of a road surface condition.

12. The detector of claim 11 wherein the transmitter generates an RF waveform for transmission via the one or more RF beams, the RF waveform comprising a plurality of chirps with each chirp having a transmit duration.

13. The detector of claim 12 wherein each chirp has a slope that is a function frequency change over the transmit duration.

14. The detector of claim 13 wherein a single data cycle count comprises 64 chirps.

* * * * *